Feb. 11, 1941.                C. OLIVETTI                 2,231,589
       DRIVING MECHANISM FOR MILLING, BORING, AND LIKE MACHINES
                      Filed Feb. 25, 1939          5 Sheets-Sheet 1
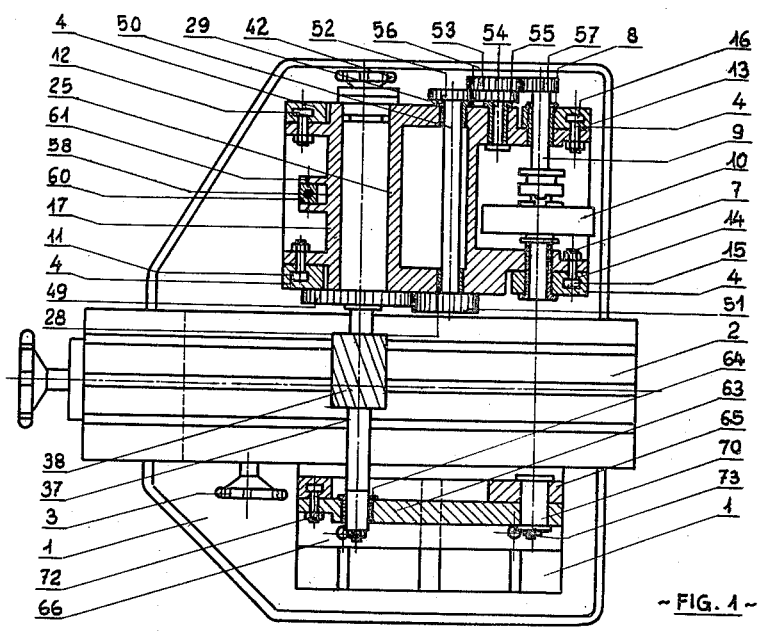
~FIG. 1~
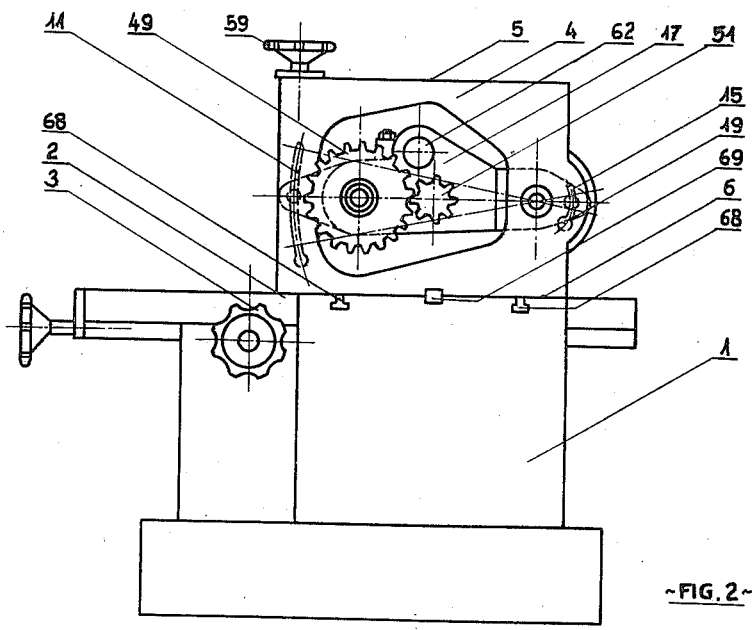
~FIG. 2~
Inventor:
Camillo Olivetti
By Young, Emery & Thompson
Attorneys Feb. 11, 1941.   C. OLIVETTI   2,231,589
DRIVING MECHANISM FOR MILLING, BORING, AND LIKE MACHINES
Filed Feb. 25, 1939   5 Sheets-Sheet 2

Inventor:
Camillo Olivetti
By Young, Emery & Thompson
Attorneys

Feb. 11, 1941.　　　C. OLIVETTI　　　2,231,589
DRIVING MECHANISM FOR MILLING, BORING, AND LIKE MACHINES
Filed Feb. 25, 1939　　　5 Sheets-Sheet 3

Inventor:
Camillo Olivetti
By Young, Emery & Thompson
Attorneys

Feb. 11, 1941.	C. OLIVETTI	2,231,589
DRIVING MECHANISM FOR MILLING, BORING, AND LIKE MACHINES
Filed Feb. 25, 1939	5 Sheets-Sheet 4

Inventor:
Camillo Olivetti
By Young, Emery & Thompson
Attorneys

Feb. 11, 1941.     C. OLIVETTI     2,231,589
DRIVING MECHANISM FOR MILLING, BORING, AND LIKE MACHINES
Filed Feb. 25, 1939     5 Sheets-Sheet 5
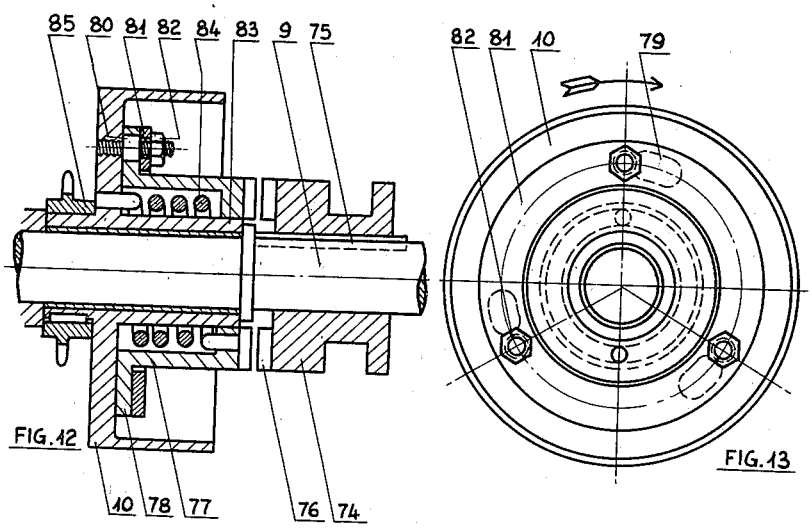
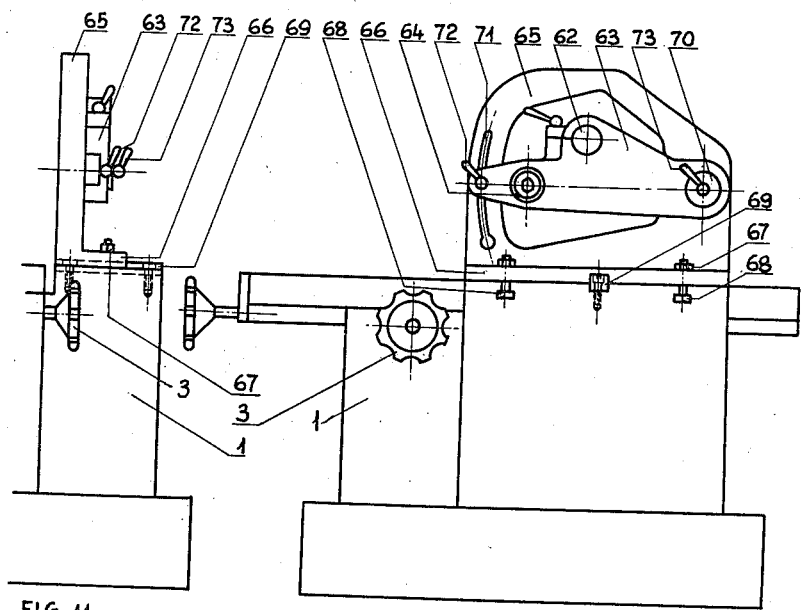
Inventor:
Camillo Olivetti
By Young, Emery & Thompson
Attorneys Patented Feb. 11, 1941

2,231,589

UNITED STATES PATENT OFFICE 2,231,589

DRIVING MECHANISM FOR MILLING, BORING, AND LIKE MACHINES

Camillo Olivetti, Ivrea, Italy

Application February 25, 1939, Serial No. 258,490
In Italy December 2, 1938

10 Claims. (Cl. 90—16)

The present invention relates to milling and boring machines, which differ in the proportions of their parts, but which operate in similar way.

The invention relates more specially to devices and mechanisms which transmit the motion from a "driving" shaft, driven directly by a motor or by pulley, gearing or other means, to another "operating" shaft, parallel to the former and bearing the tool (cutter, reamer, drill, or the like). Said devices are made and arranged so as to obtain a machine of high efficiency, quickly adjustable, and in which, when adjusted, the tool bearing shaft can be steadily kept in the position wanted so as to afford a precise and efficient work. Moreover, the device is cheap to manufacture as all its parts are of simple construction and easy to assemble.

The invention can be applied to any type of milling or boring machine, but it finds its most useful application to boring machines and planer type milling machines of the kind in which the table whereon the work piece is secured can move in one direction only (generally horizontal) on slides fixed on the frame of the machine, whilst the spindle bearing the tool (cutter, reamer, drill or the like) is maintained with its center line parallel to the plane of the table and perpendicular to the direction of sliding of the same. Said spindle may be made adjustable vertically, this displacement taking place without angular displacement of the spindle, so as to place it in the working position at a suitable distance from the table and then fasten it in such position. This spindle can also be displaced longitudinally along its center line so as to locate and then fasten the tool (cutter) in the proper position.

In order to clearly describe the nature of the invention, the same is now described hereinafter, with reference to the accompanying drawings representing the application to a planer type cutting machine, although it is not intended to limit the application of the invention to the special type of tool machine.

In the accompanying drawings, considering as the front the side where the operator stays during the milling operation, near the driving crank:

Fig. 1 is a horizontal section, seen from above;

Fig. 2 is a front view of the machine, all the front part bearing the head stock;

Fig. 10 is a front view of the part of the machine acting as support for the end of the cutter shaft during operation;

Fig. 11 is a side view of the same;

Fig. 12 shows the detail of the pulley transmitting the motion of the shaft and the mode of coupling it to said shaft;

Fig. 13 is a view of the same;

Figure 3:
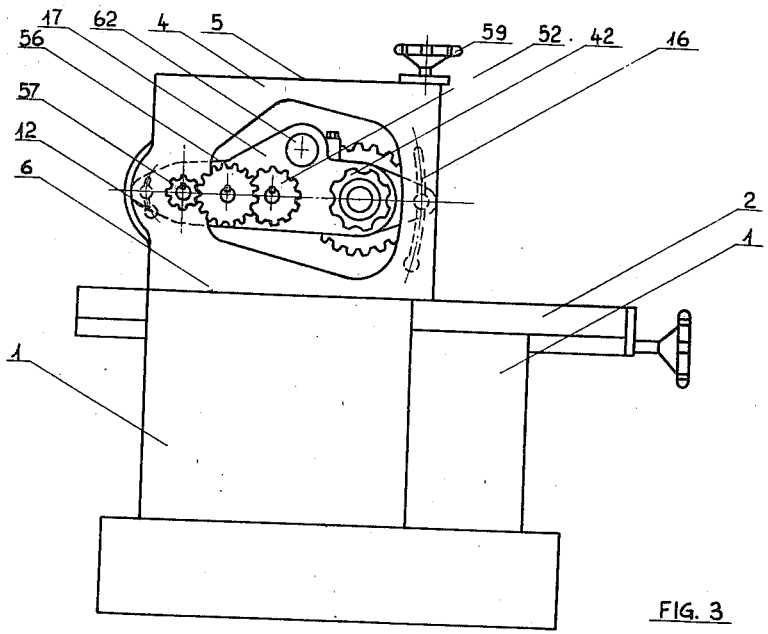
Fig. 3 is a rear vertical view of the machine.

The frame 1 (see Figs. 1—2—3—5—10—11) with suitable guides whereon the table 2 can slide, bears the bulk of the mechanisms whereby the motion is transmitted from the driving pulley (or the motor, if the machine is directly coupled to the latter) to the shaft bearing the tool (cutter or the like).

The means for obtaining the displacements of the cutter shaft and the means for fixing the same during operation form the subject of the present invention and are described hereinafter in their essential parts and diagrammatically represented in the attached figures, whilst the longitudinal movements of the table and the control of its displacements, forming the subject of another invention, are here omitted, only the handwheel 3 used by the operator to control the movements of said table (Figs. 1—2—5—10—11) being shown.

The assemblage of the above mechanisms is supported by a rigid frame 4 (Figs 1, 2, 3, 4, 5) firmly secured on the frame 1, rear side.

This frame 4 consists of a box or casing partly closed in its upper part 5 and lower part 6.

The front and rear sides are provided with holes 13—14 in which two bearings 7—8 are fitted. In these bearings 7—8 rotates the shaft 9 which bears the driving pulley 10. Two grooves 11 and 12 with a T cross-section are cut in the sides following a circular arc whereof the center is on the center line of the holes 13—14, which is also the geometric axis of shaft 9 bearing the driving pulley 10.

15 and 16 indicate two other slots, having the same cross-section, and also having a circular arc contour with the center in the geometric axis of shaft 9, wherein fastening bolts can pass. A movable frame 17 (Figs. 1—2—3—4—5—7—8—9) is located inside this fixed frame or casing 4, being rotatably supported on the extensions of the bearings 7 and 8, so that its axis of revolution coincides with the shaft 9 bearing the driving pulley 10.

The frame 17 is provided with holes bearing bolts 18 with heads engaging the T grooves 11—12—15—16, whereby said movable frame may be fastened to the fixed frame 4 and, therefore, to the bed 1 of the machine. Two such holes are pierced in brackets 19, 20. It is possible thereby to displace the movable frame 17 and to fasten the same on the fixed frame 4 during rotation of the pulley 10 and shaft 9.

Figure 7:
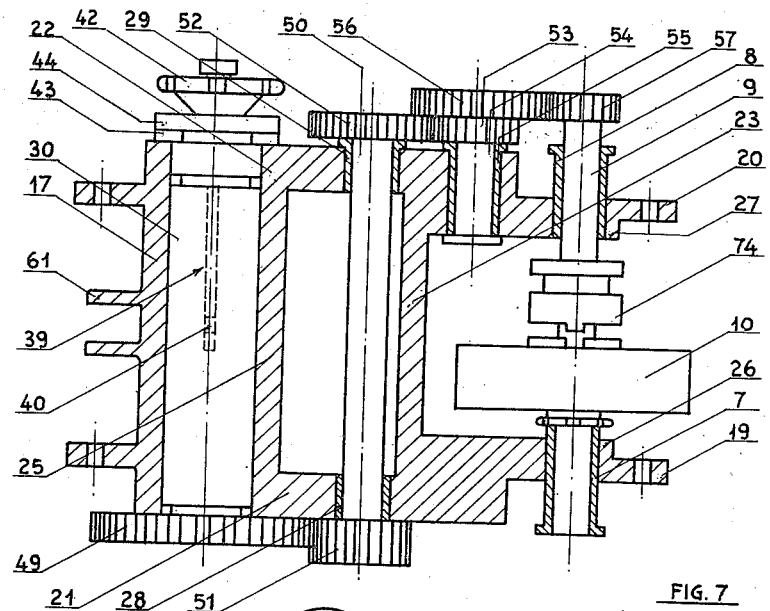
Fig. 7 is a section of the movable part as in Fig. 4, but detached from the fixed part of the machine.
Figure 8:
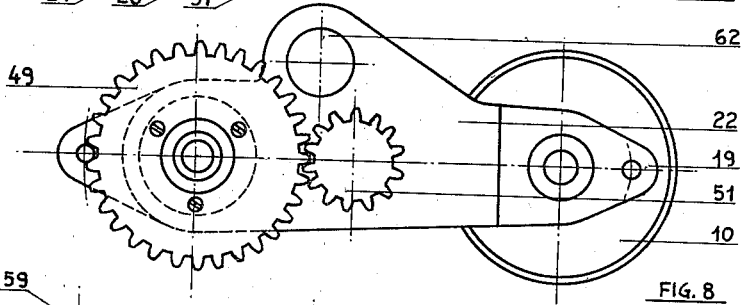
Fig. 8 is a view of a part of the mechanism transmitting the motion from the pulley to the cutter shaft seen from the front of the machine.
Figure 9:
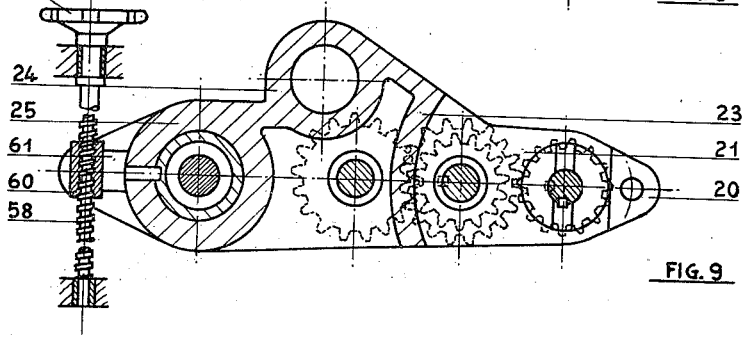
Fig. 9 is a section of the same part and shows with dotted lines the view of that part of the mechanisms which is in the rear of the machine.

Referring to Figs. 7—8—9, the movable frame 17, consists of two walls 21 (front) and 22 (rear) having the form shown in the figure and connected at their ends by a tile-shaped wall 23 and a bored cylinder 25, and, in an intermediate zone, by a second bored cylinder 24.

On the walls 21 and 22, besides the two holes 26 and 27 containing the extensions of the bearings 7 and 8, two other holes are drilled, bearing the two coaxial bearings 28 and 29.

The bearing might be replaced by ball-bearings.

The center line through the holes 28—29 is located on the plane determined by the center line of the bored cylinder 25 and the center line of the bearings 7 and 8 (coinciding with the center line of the shaft 9) or on a near plane.

On the same plane, or not very far therefrom, are the holes pierced in the brackets 19—20, containing the bolts for fastening the movable frame 17 to the fixed frame 4.

Another bored cylinder 30 (Figs. 1—6—9), bearing on the front end a conical bearing 31 with flange 32, can slide inside the bored cylinder 25. The rear end 33 of said cylinder 30 is of a lesser diameter, has a screw cut on its outside surface and is provided with a bearing 34 inside. The bearings 31 and 34 bear a shaft 35 bored all its length through and to which the shaft 37 bearing the cutter 38 is fixed by means of a coned extension 36, according to a method which is common nowadays to all milling machines.

The cylinder 30 is provided also with a groove 39 engaging with a pin or key 40, fixed to the wall 25, so that, whilst rotary motion of said cylinder is prevented, the same is free to displace longitudinally along its center line, this being required to bring the cutter to the position wanted.

This longitudinal displacement is obtained by a screw sleeve 41 with fine pitch engaging with the screw 33 and provided with a handwheel 42 which can be turned by the operator.

The sleeve 41 has also a circular groove on the outer surface in which engages a split ring fastened to the wall 22 by screws, said split ring allowing rotation of said sleeve and preventing longitudinal displacement thereof. On said sleeve 41 is also mounted with slight friction a graduated ring 44, whereby the displacement of the cutter can be controlled.

In correspondence to the conical bearing 32 also the shaft has conical journal. A split nut 45 is provided to adjust exactly the shaft on the bearing, said ring being screwed on a thread 46 on the shaft and blocked by a screw 47 on the thread of the shaft. A disc for lessening the friction may be interposed between the collar 48 and the flange 32.

The shaft 35 is provided with said front collar 48 whereby a gear 49 (Figs. 1—2—4—5—6—7—9) is fixed thereon by screws.

A shaft 50 can rotate inside the bearings 28—29, and a gear 51 is fixed thereon; the width of this gear is greater than that of the gear 49, so that when the cylinder 30 is displaced longitudinally to adjust the cutter, the teeth of the gear 49 engage always completely with those of the gear 51. The difference between the thicknesses of the gear 49 and gear 51 represent the displacement admissible for the longitudinal adjustment of the cutter.

In certain cases the milling machine might be employed as a drilling or boring machine and this difference represents the maximum length wherewith the machine can be used for these operations.

The shaft 50 bears a gear 52 engaging with a gear 53 on a shaft 54 rotatable in a bearing 55 located in a bore in the rear wall of the movable frame 17.

Another gear 56 is rigidly coupled with the gear 53 and carried by the same shaft 54; this gear engages with a gear 57 fixed at the end of the shaft 9 bearing the driving pulley 10. The motion is transmitted by the driving pulley 10 to the shaft 9 and from this, through the system of gears 57, 56, 53, 52 on the rear side of the machine, to the shaft 50 which, through the gear 51 drives the wheel 49, the shaft 35 and, finally, the cutter.

The gears 57, 56, 53, 52, as well as the gears 51, 49, can be removed from the shafts which rotate them and replaced with other ones having the same distance between the center lines, so that, by changing said gears, many speeds of the cutter shaft can be obtained from a same speed of the driving pulley.

The gears 57, 56, 53, 52 are in their assembly a set of gears as in screw cutting lathes and other tool machines and are easily interchangeable. Also gears 51 and 49 may be changed with other ones so as to have a further series of different speeds.

Casings not indicated in the drawings protect these gears and provide lubrication thereof; they also prevent longitudinal displacements of said gears, as usually performed in many of such machines.

The vertical displacement of the shaft 37 (and therefore of the cutter) is obtained and controlled by a vertical screw 58 (Figs. 4—5—9) driven by a handwheel 59 (Figs. 2—3—4—5—9).

The screw 58 can turn, on apposite smooth portions thereof, in two holes pierced in the walls 5 and 6 of the fixed frame or casing 4 and is guided so as to prevent vertical displacements.

The screw 58 engages with a nut 60 enclosed within two flanges 61 having vertical parallel flanges projecting from the movable frame 17.

The nut 60 is provided with lateral upper and lower expansions whereby it encloses the flanges 61 so as to trail the same when displacing.

A certain clearance is left between expansions and flanges, so as to allow the slight displacement which is necessary because the nut moves along a rectilinear path whilst the flanges move along a circumference.

Owing to the devices described above, when the vertical adjustment has been obtained, by tightening the bolts fastening the fixed fame 4 on the movable frame 17 as shown above, all the mechanism supported by the latter and consequently also the cutter shaft are fixed in the desired position. A graduation on the lower part of the handwheel 59 may facilitate said adjustment.

In the internal hole of the cylindric connection 24 already described may be located and fixed a strong bar 62, as long at least as the width of the machine, serving to connect the movable frame 17 with another movable piece 63 bearing a bushing or stock head 64, inside which the end of the shaft 37 bearing the cutter can rotate. The means for fixing the bar 62 to the movable frame 17 may be similar to those used in known milling machines, but the means for supporting the part 63, and bushing 64, and for fixing the same to the bed 1, form part of the invention and are therefore particularly described.

A sort of hollow frame 65, having the shape represented in vertical projection by Fig. 1 and also by Figs. 5—10—11, is fixed on the front part of the machine bed. This frame 65 is provided at its lower part with a base 66 which by means of bolts 67 ban be secured over two T grooves 68 parallel to the center line of the cutter shaft and cut out in the bed of the machine so that the frame 65 can be displaced more or less according to the width of the piece to be milled, and can be worked under the best conditions.

For displacing the frame 65 parallel to itself, this is guided by a block 69 whereof the sides are parallel to the center line of the cutter and which is fixed to the bed of the machine.

A groove cut in the foot 66 of the frame 65 engages exactly with slight friction on said block 69, so that the frame 65 is perfectly guided without rotation during its displacement. Said displacement of the vertical frame 65 may be facilitated by providing the bottom of the latter with a rack engaging with a pinion whereof the axis must be perpendicular to the displacement, or else by means of a quadrilateral link with axes perpendicular to the direction of the displacement, or by other known mechanical means.

When the desired displacement of the frame 65 is obtained, this is fixed to the machine bed by means of bolts 67. In the frame 65 is pierced a hole whereof the center line coincides with that of the shaft 9 bearing the pulley 10.

Inside this hole is located, and can be fastened, a cylindric piece 70 ending with a screwed part of lesser diameter. The frame 65 at the opposite end is provided with a T groove having the profile of a circular arc with the center on the center line of the cylindric piece 70 and, therefore, also on the prolonged center line of shaft 9.

A piece 63, having the shape as in the drawings, rests on the vertical side of frame 65. Said piece has four holes one of which fits to the surface of the piece 70, another on the center line of the shaft 37 bearing the cutter fits to the bushing 64 whereon said shaft rotates, another is pierced on the center line of groove 71 and the fourth is on the center line of the bar 62 passing therethrough and fitting thereto. While the movable frame 17, by means of the screw 58, is brought to the desired position then fastened to the fixed frame 4 as described above, the piece 63 can rotate with slight friction on the outer surface of the cylindric piece 70. During this rotation, the piece 63 is trailed by the bar 62 and, consequently, the bearing 64 is also trailed and the cutter shaft 37 can continue its rotation inside the same, owing to the above coincidence of the rotational axes of the system and the cutter shaft.

When the movable frame 17 has been fastened to the fixed frame 4 in the position wanted, the piece 63 can in turn be fixed and pressed against the outer surface of the vertical frame 65 by means of a bolt 72 entering in the T groove 71 and a tapped nut or crank 72 engaging with the worm of the piece 70.

The bar 62 can be fastened also on the piece 63 by a locking split ring with a screw or screw crank in a normal manner. By the above devices the piece 63 and, consequently the bushing 64, follow the movements of the movable frame exactly and can be easily adjusted in the position required.

The bushing 64 may also be replaced by a screw journal ending with a conical point engaging with a conical cavity drilled at the end of the shaft 37, this system being preferable, however, only for light work.

Bushing similar to the bushing 64 may be interposed and supported by the bar 62. The bar 62 has in the figure a cylindric shape as this is of easier construction and adjustment, but may have also other shapes, such as that of a piece with a reverse U cross section, the subject of this invention consisting in the function of this piece and not in its shape.

The main features of this invention concern: the form of the fixed frame 4; the form of the movable frame 17; the assembly of the mechanisms transmitting the motion from the driving pulley to the cutter shaft; the means for displacing said mechanisms and fixing the movable part to the fixed frame and consequently to the machine bed; the form of the piece bearing the bushing supporting the end of the cutter shaft; the means for displacing and successively fixing said piece to its vertical support, so as to form a rigid whole with the machine bed.

Figs. 12 and 13 show a cross section and a front view of shaft 9 and driving pulley 10 and the device for transmitting the motion from the pulley to the shaft 9 and from the latter to the set of gears driving the cutter shaft. A collar 74 is slidable on the shaft 9 which is provided with a key 75 to prevent the rotation of said collar, allowing, however, the longitudinal displacement.

The collar 74 is provided with teeth 76, which, by the longitudinal displacement of the collar can engage with other teeth on a bored piece 77 ending with a circular flange 78.

The flange 78 is fixed on the pulley 10 as follows: said flange is provided with three slots along a circumference with the center on its center line of the shaft. The slots have a certain angular amplitude and engage with three bolts 80 screwed on the pulley and having a thickened middle section, of a diameter equal to the width of the slot, minus a slight clearance which will be hereinafter explained. The length of the cylindric middle section of the bolts is slightly greater than the thickness of the flange 78, so that, putting a ring 81 on the bolts locking the nuts 82, the flange 78 is pressed with slight friction and can rotate, relatively to the pulley 10, through an angle limited by the peripheral lengths of the slots 79.

The piece 77 of the toothed part has the same diameter of the hub 83 of the pulley 10 and can rotate thereon.

A strong spring 84 is enclosed within the space with cylindric walls existing between the piece 77 and the hub 83, said spring being fixed at one end to the inner wall of the pulley 10 and at the other to the piece 77. This spring 84 is initially tensioned, and, therefore, the three bolts 80 are pressed, in correspondence to their cylindric middle section, against the ends of the three slots and, when the machine is at rest, and the collar clutch is not inserted, the piece 77 is unitary with the pulley. When the clutch is inserted and the machine is started, owing to the inertia of the shaft 9 and the whole device actuating the cutter and, mainly, to the resistance met by the work to the cutter, the spring becomes further tensioned and a slight rotation takes place between the pulley and the flange 78 and, therefore, the rest of the mechanism, said rotation damping the starting action and being limited by the amplitude of the circular slots 79. By this way the operation of the machine is rendered gentle and uniform by the action of the spring 84 and the mechanisms are preserved against sudden jerks.

This result is enhanced by the fact that the cylindric section of the bolts 80, located in the cavity between the circular slots 79 is slightly lesser than the width of said slots, as specified above.

The inner walls of the pulley 10 and ring 81 prevent the air existing inside the slots 79 from escaping through other ways, so that there is a certain damping influence due to the air forced between the walls of the slots 79 and that of the cylindric middle section of the three bolts 80.

The same elastic system may be adopted also in the case of drive by gear instead of pulley.

The pulley 10 is provided with a lateral sprocket 85, the teeth of which can engage with a chain of the Galle or other type.

By means of this sprocket and a chain not shown, the motion of the driving pulley 10 can be transmitted to another part of the machine, to the mechanism of translation of the table 2, to the oilpump and other devices of the machine, this part, however, not being described as not forming part of the invention.

Figure 4:
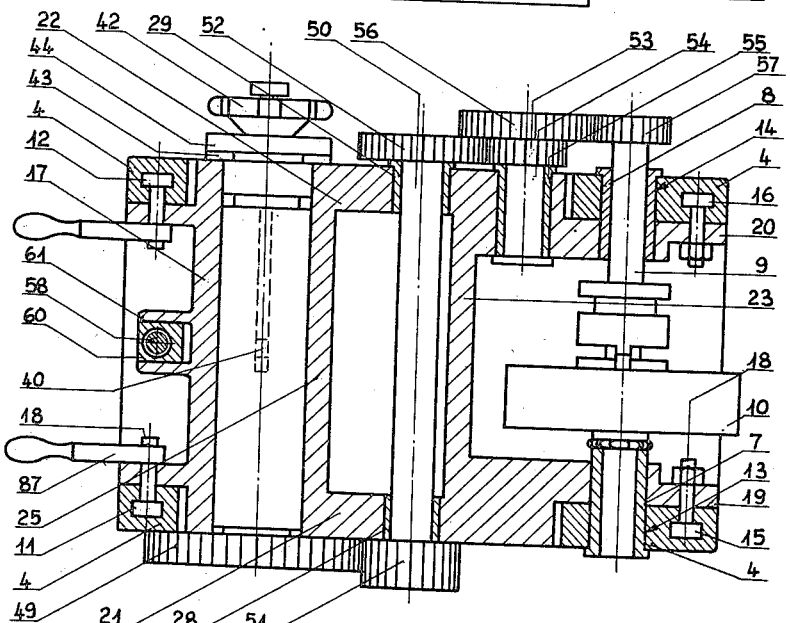
Fig. 4 is a section of the mechanisms for transmitting the motion from the pulley to the cutter shaft and retaining the same in position during operation.
Figure 5:
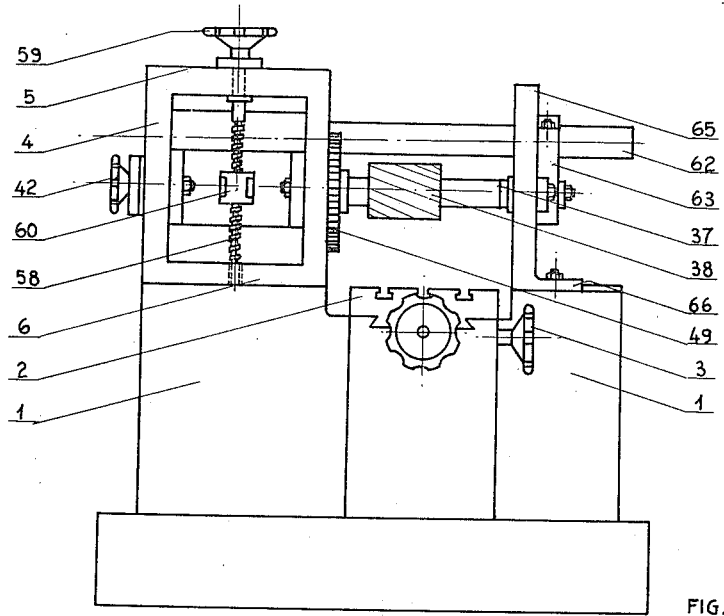
Fig. 5 shows the machine seen at the left of the operator.
Figure 6:
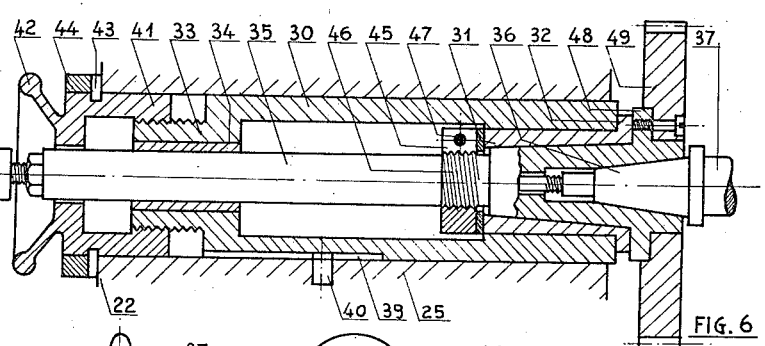
Fig. 6 shows the construction of a part of the machine comprising the cutter shaft.
Figure 14:
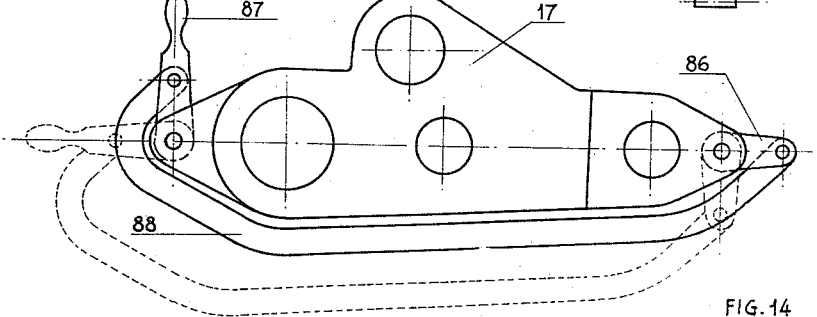
Fig. 14 is a view of the connection of the cranks for fixing the movable frame to the fixed frame in their definite position.

The nuts of the bolts 18 which fix the movable frame 17 to the fixed frame 4 may be replaced by more easily manipulated screw threaded handles. In Fig. 4, 87 designates the handle replacing the nut of bolt in groove 11 and in Fig. 14, 86 designates fixing the handle replacing the nut of bolt in groove 15. To facilitate the fixing operations the handles 86 and 87 may be interconnected so that, by moving two handles only on one side of the machine, the movable frame 17 can be firmly fastened to the fixed frame 4 and, therefore, to the rest of the machine. A diagram of said connection is illustrated by Fig. 14, where 87 indicates the locking handle, 86 is the right handle; 88 is a rod for transmitting rotation through a certain angle from the position indicated by the full line to the one indicated by the dotted line.

It is to be noted that the relative position of the two handles is such that the locking of the two bolts takes place successively, owing to one handle being at a dead center with respect to the connecting rod whilst the other handle is locked. In this way the locking strain is exerted alternatively on one handle only. The nuts, however, must be threaded in opposite directions.

The movable frame 17 has been described as entirely placed inside the fixed frame 4. The same result would be obtained, however also if a part of the movable frame is outside the fixed frame, provided that the web of the frame 4 be wide enough to allow assembly.

For facilitating this operation, practically, washers may be interposed between the flanges fixing the movable frame 17 to the fixed frame 4, this facilitating the assembly. These constructional details, like others, are not represented in the drawings as they are well known.

What I claim is:

1. In a machine tool, driving mechanism comprising a drive shaft, a tool shaft parallel to the drive shaft, intermediate shafts parallel to the drive shaft and movable in a circular path around the same, gear means between intermediate shafts and said drive and tool shafts, a frame pivotable about the axis of the drive shaft, supporting means for the shafts of said set fixed in said frame, a casing fixed on the bed of the machine tool and having walls surrounding the pivotable frame, and means for connecting said walls to the said frame whereby these parts form a rigid assembly holding said tool shaft in desired position in said circular path.

2. Mechanism according to claim 1, wherein the pivotable frame is connected to the casing by means of T grooves cut in the casing and located near the tool shaft and other similar grooves located near the driving shaft, bolts being provided applied on the said frame and engaging by their heads in said grooves.

3. Mechanism according to claim 1 wherein the pivotable frame and fixed casing comprise two sides parallel to each other and connected to each other by connecting members one of which consist of a bored cylinder coaxial with the tool shaft and provided with a seat for a nut actuated by a screw, in such a manner that displacement of said nut rotates the said frame to bring the tool shaft to the position required, said frame being provided with bolts for fastening the same on the fixed casing and a bar for the connection with another part of the machine carrying the bearing of the tool shaft.

4. Driving mechanism for machine tools according to claim 1 in which the gear means comprise pairs of gears mounted on the various shafts, whereof the first pairs, starting from the driving shaft, are located on the rear part of the machine in an easily accessible position to facilitate change of gears, whilst the last pair is located on the front part of the machine, the driven gear being preferably connected with the tool shaft.

5. Driving mechanism for machine tools, according to claim 1 in which the gear means comprise pairs of gears mounted on the various shafts, whereof the first pairs, starting from the driving shaft, are located on the rear part of the machine to an easily accessible position to facilitate change of gears, whilst the last pair is located on the front part of the machine, the driven gear being preferably connected with the tool shaft, and in which the gear transmitting the motion to the tool shaft is mounted as near as possible to said tool.

6. Mechanism according to claim 1 comprising a mandril non-rotatably axially displaceable in the pivotable frame and, provided with a handwheel, a shaft actuated by said mandril, bushings supporting said shaft for rotation but not longitudinal displacement relatively to said mandril, and means connecting said shaft with the tool shaft.

7. Mechanism according to claim 1 comprising a vertical screw rotating in bushings fixed on the machine bed, a handwheel fixed on said screw, a nut engaged by said screw and carried by the pivot frame so that it cannot rotate in but transmits its movements to the latter, said nut being capable of slight displacement with respect to the frame to provide for the difference between the paths of the nut and the frame.

8. A driving mechanism for machine tools comprising a driving shaft and a set of shafts, including a tool shaft, parallel to the driving shaft, a frame supporting said set of shafts whereby they are a frame supporting said set of shafts whereby they are circularly displaceable around the driving shaft and fixable in any position desired, means supporting the tool shaft at its rear end, a connecting member carrying said supporting means and rotatable through a certain angle about an axis which coincides with the extended axis of the driving shaft, a vertical frame member on the machine tool bed, means including nut and bolt members in said connecting member said means engaging in a circular groove of T section cut in said vertical frame member and having its center in the axis of the driving shaft, a longitudinal bar sustaining said connecting member and supported by said movable frame said bar being fixable on and displaceable with said frame through a certain angle, a bushing supporting the tool shaft at its other end, and means whereby said bushing can be locked in adjusted position of said tool shaft.

9. Mechanism according to claim 8 wherein the frame member with the vertical wall whereto the movable part carrying the bushing supporting the end of the tool shaft can be fixed, is displaceable parallel to itself in the direction of the axis of the driving shaft, and means are provided for guiding said frame and locking it in the position desired.

10. In a machine tool, driving mechanism comprising a drive shaft, means supporting said shaft, a set of shafts parallel to the drive shaft and movable in a circular path around the same, one of said shafts having means for carrying a tool, a frame rotatably mounted on the support means of the drive shaft, supports for the circularly movable shafts, said supports being fixed in said frame, a casing enclosing the rotatable frame and fixed to the bed of the machine tool, said casing having a T groove therein, and locking bolts for said frame having heads engaging the T groove whereby the tool shaft can be fixed in desired position in said circular path, two of said bolts being in proximity of the supports of the tool shaft.

CAMILLO OLIVETTI.